(12) United States Patent  
Fay

(10) Patent No.: US 7,872,650 B2
(45) Date of Patent: Jan. 18, 2011

(54) REMOTELY VIEWING LARGE TILED IMAGE DATASETS

(75) Inventor: Jonathan Fay, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 11/679,697

(22) Filed: Feb. 27, 2007

(65) Prior Publication Data

US 2007/0252834 A1 Nov. 1, 2007

Related U.S. Application Data

(60) Provisional application No. 60/745,831, filed on Apr. 27, 2006.

(51) Int. Cl.
*G06T 17/00* (2006.01)
(52) U.S. Cl. ............... 345/428; 345/418; 345/661; 382/148
(58) Field of Classification Search ............ None
See application file for complete search history.

(56) References Cited

U.S. PATENT DOCUMENTS

| 6,111,583 A * | 8/2000 | Yaron et al. ........... 345/421 |
|---|---|---|
| 6,721,952 B1 * | 4/2004 | Guedalia et al. ........... 725/38 |
| 7,212,217 B1 * | 5/2007 | Feather et al ........... 345/630 |
| 7,551,182 B2 * | 6/2009 | Bethune et al. ........... 345/619 |
| 2005/0020336 A1 * | 1/2005 | Cesare ........... 463/9 |
| 2005/0144633 A1 * | 6/2005 | Babayan ........... 725/24 |
| 2006/0036949 A1 * | 2/2006 | Moore et al. ........... 715/730 |
| 2006/0170693 A1 * | 8/2006 | Bethune et al. ........... 345/568 |
| 2006/0218295 A1 * | 9/2006 | Yano ........... 709/231 |
| 2008/0051994 A1 * | 2/2008 | Fisher et al. ........... 701/210 |

* cited by examiner

*Primary Examiner*—Said Broome
(74) *Attorney, Agent, or Firm*—Lee & Hayes, PLLC

(57) ABSTRACT

Systems and methods are described for remotely viewing large tiled image datasets, such as global maps at multiple resolution levels. A voting schema immediately retrieves the image tiles in a multi-resolution image dataset that are most likely to provide temporary complete coverage of a given browser view while more numerous optimal image tiles for the current resolution level of the browser view are still downloading. Image tiles that are not locally available are assigned one vote toward immediate download while their parent and higher-order image tiles accumulate increasing multiples of the vote. This provides panning and zooming such that it is difficult for a user to outdrive the update speed of the changing view. The system can also enhance navigation to provide natural and responsive movement of the browser viewport while image tiles are being downloaded.

20 Claims, 7 Drawing Sheets

REMOTELY VIEWING LARGE TILED IMAGE DATASETS

RELATED APPLICATIONS

This patent application is related to U.S. Provisional Patent Application No. 60/745,831 to Fay, entitled, "Remotely Viewing Large Tiled Image Datasets," filed on Apr. 27, 2006, and incorporated herein by reference.

BACKGROUND

When viewing an image on an electronic display such as a computer monitor, it is often desirable to see the image at different magnification levels and to pan around different parts of the image. The panned and zoomed image data has to fit a constant 2-dimensional viewing area of the user's display. For higher resolutions—close-ups—the viewing area of the display can only show one close-up at a time.

For many images, when the image subject matter is not on a grand scale, or, microscopic magnification is not needed, a single image captures enough detail so that the image can just be scaled to provide different resolution levels. More often, however, the subject matter of the image cannot be captured at high resolution in a single image. For example, it is not practical to scale a single image of the entire world captured from space so that the scaling of this single image can provide a treetop view of any place in the world.

Rather, for large-scale images, a multi-resolution hierarchy of images is adopted. Examples of such large-scale images are satellite and aerial maps, both local and global, and extremely large panoramic images. As shown in FIG. 1, the images are often managed by a tiling scheme shown by the tiling decomposition diagram, in which the tiles are placed in a "tile image hierarchy" 100 and swapped in various ways to try to produce a satisfactory view for the user at a given location and zoom level in the image. For example, in one decomposition scenario, a first level includes four tiles (e.g., such as four of tile 102) that portray the entire image; a second level portrays the entire image in 16 tiles of higher resolution (e.g., tile 104), a third level portrays the entire image in 64 tiles of even higher resolution (e.g., tile 106), and so forth.

In conventional systems for remotely browsing such large-scale images, the tiles for any given level are queued up for download as they are needed. Then the queued tiles must be transmitted to the remote user's machine, typically over a network such as the Internet. Sometimes some of the tiles surrounding but not included in the area to be immediately viewed are also retrieved in a "read ahead" manner in order to anticipate the user panning to adjacent areas that are as yet still off the display area. This makes the next probable images available near at hand, so that if they are needed, they appear faster than if their download began when they were already needed to create a view. Even with this read ahead capacity, such conventional systems usually suffer from the problem of the user "outdriving" the available tiles. That is, the user may pan and zoom with a mouse or pointing device faster than the image tiles needed to create a view on the display can be downloaded. This leaves fresh areas of the screen cluttered with blank areas where the missing tiles are not yet available to display. Or, each new zoom layer may be disturbed by a visible and annoying repainting of the screen.

Conventionally, requests to download new images (new tiles) are sent for the tiles belonging to the resolution level of the current view, and the resulting download time greatly constrains the freedom of movement and navigation speed of the viewer.

SUMMARY

Systems and methods are described for remotely viewing large tiled image datasets, such as global maps at multiple resolution levels. A voting schema immediately retrieves the image tiles in a multi-resolution image dataset that are most likely to provide temporary complete coverage of a given browser view while more numerous optimal image tiles for the current resolution level of the browser view are still downloading. Image tiles that are not locally available are assigned one vote toward immediate download while their parent and higher-order image tiles accumulate increasing multiples of the vote. This provides panning and zooming such that it is difficult for a user to outdrive the update speed of the changing view. The system can also enhance navigation to provide natural and responsive movement of the browser viewport while image tiles are being downloaded.

This summary is provided to introduce the subject matter, which is further described below in the Detailed Description. This summary is not intended to identify essential features of the claimed subject matter, nor is it intended for use in determining the scope of the claimed subject matter.

DETAILED DESCRIPTION

Overview

This disclosure describes systems and methods for remotely viewing large, tiled image datasets. Exemplary tile-handling and downloading techniques improve the speed and realism of graphics presented to a user, especially during quick panning and zooming movements. An exemplary voting technique prioritizes the tiles in the queue of tiles to be downloaded so that the most important tiles for creating a full and/or realistic view are downloaded first. In one implementation, a voting scheme downloads image tiles such that the tile downloaded first will cover the most area of the view to be painted.

Figure 1:
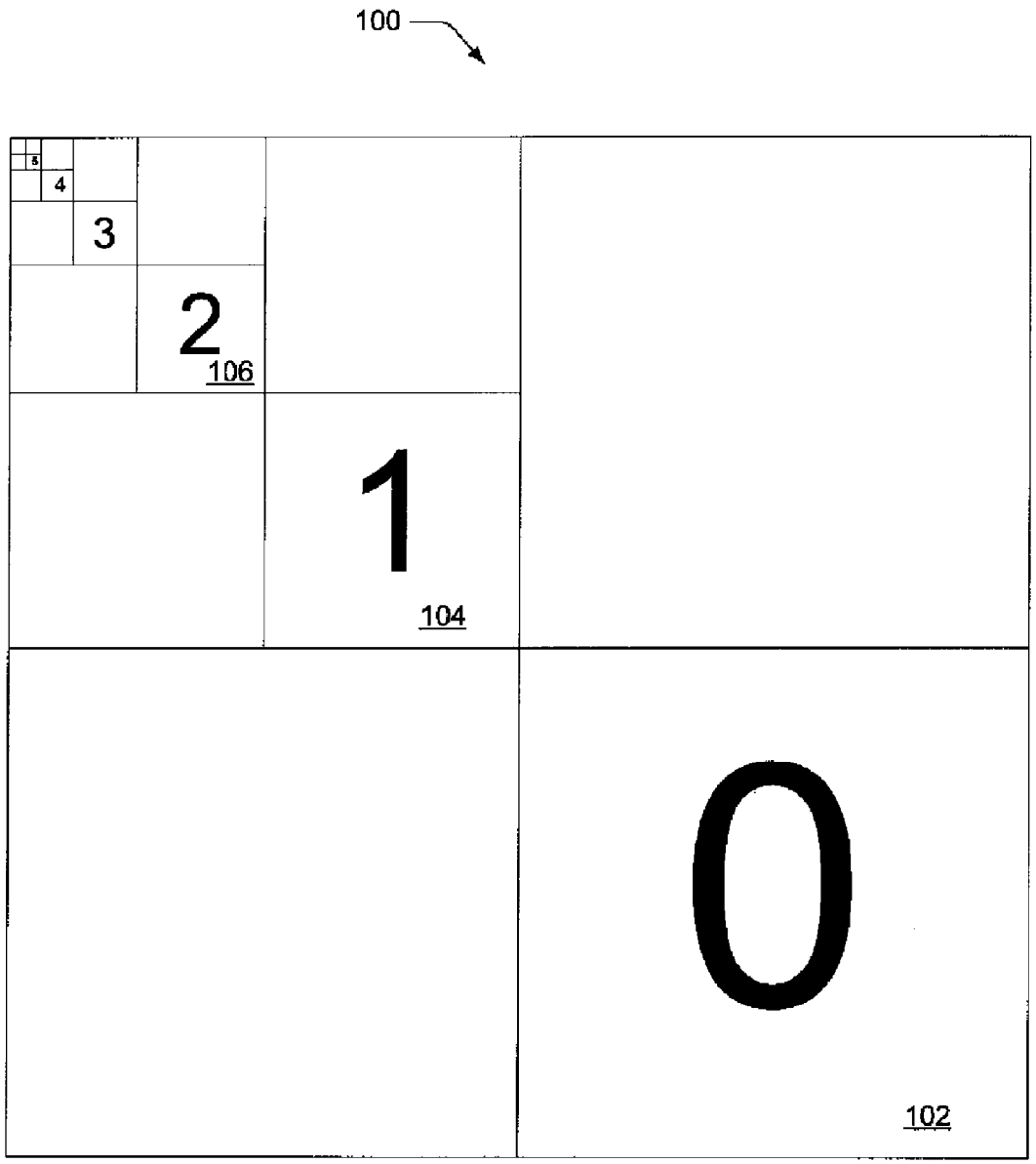
FIG. 1 is a diagram of conventional image decomposition.
Figure 2:
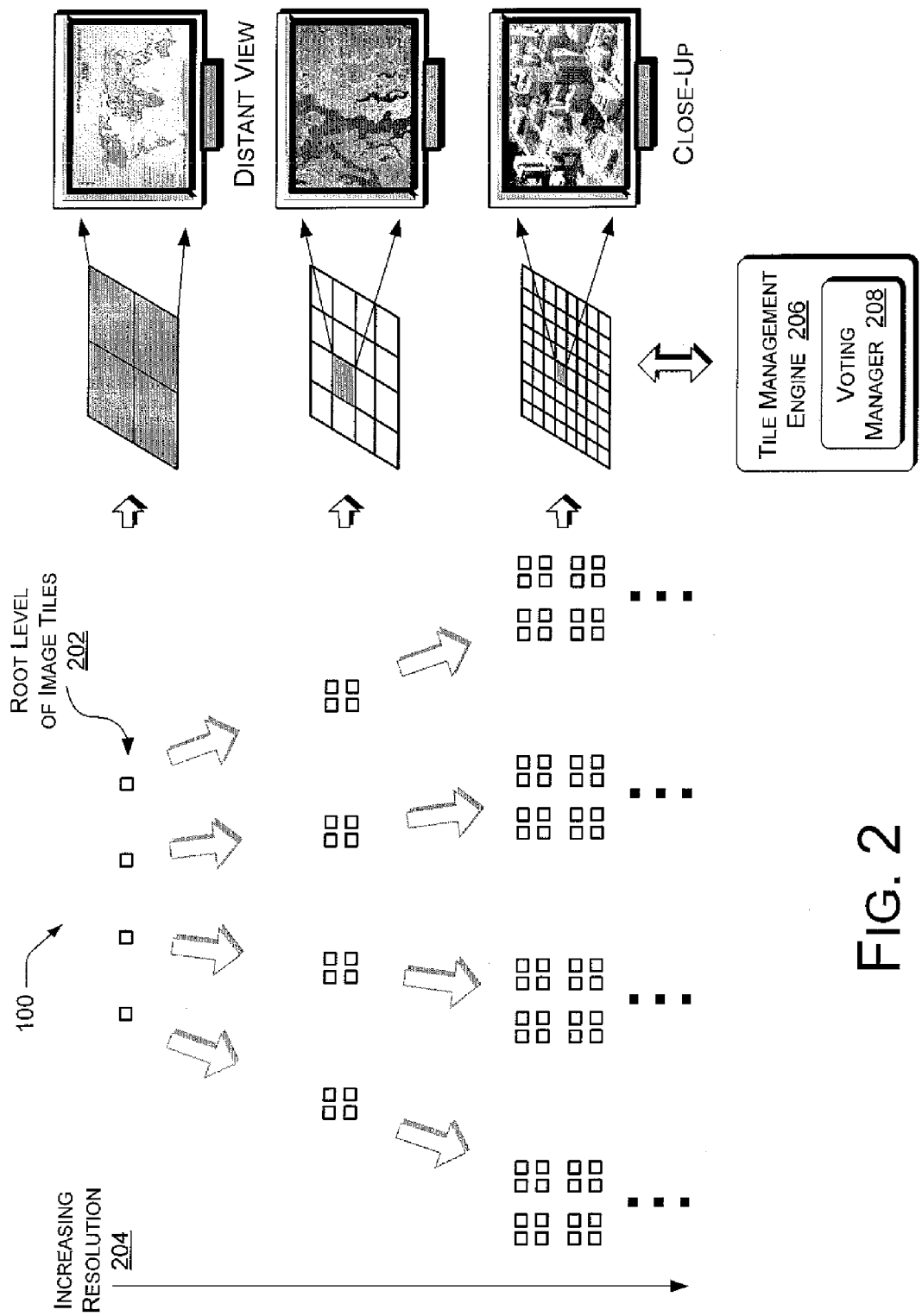
FIG. 2 is a diagram of an image tile hierarchy and exemplary tile management engine.

FIG. 2 shows another view of the tile image hierarchy 100 of FIG. 1. When managing large image-based datasets, the hierarchy 100 consists of a pyramid of tiles in which a few tiles at the first level 202 (sometimes called a root or base level) portray the entire image of the subject matter (global map, large panoramic image, etc.) as seen from some distance. Each subsequent level of the pyramid subdivides the first level in some manner and provides increasing resolution 204, allowing for efficient computation and data handling (i.e., transfer to a remote client) of a portion of the image without having to compute, transfer, or scale the entire image.

In various implementations the exemplary systems and methods target different image dataset types. One implementation has a viewer for worldwide map and aerial/satellite imagery. Another implementation has a generalized viewer designed to view large panoramic images stored in tiled, multi-resolution format. Yet another implementation visualizes astronomic images from digital sky surveys. In one implementation, a tile hierarchy of worldwide imagery uses eighteen resolution levels derived from weather satellite, Landsat, and aerial photography imagery. When a starting tier of four image tiles forms the top of a pyramid hierarchy in which each tile has four children tiles, the number of tiles to be reckoned with to show the entire earth at the different resolution levels is over 17 billion tiles.

All three of the above exemplary implementations can have a common tile access and user interaction model. The user is presented with a top-level view of the entire image in 1-8 tiles; either the entire earth, a panoramic image, or the night sky, etc. The user can then pan around the image by clicking the mouse button and dragging in the direction of desired motion. The user may also roll a mouse wheel forward and backwards to zoom in and out of the image. When navigating the large-scale image, it is often desirable to start at this full width view provided by the single or few tiles at the first (root) level 202 and then zoom in on detailed regions, while panning around the image to find the area of interest. It is also common to select an area of interest from a list, pan over the image, and then zoom to a level of detail that frames the area of interest. An exemplary tile management engine 206 exploits the structure of the tile image hierarchy 100 via a voting manager 208 to reliably post a responsive and realistic view to the user's viewport regardless of aggressive panning and zooming.

Exemplary System

Figure 3:
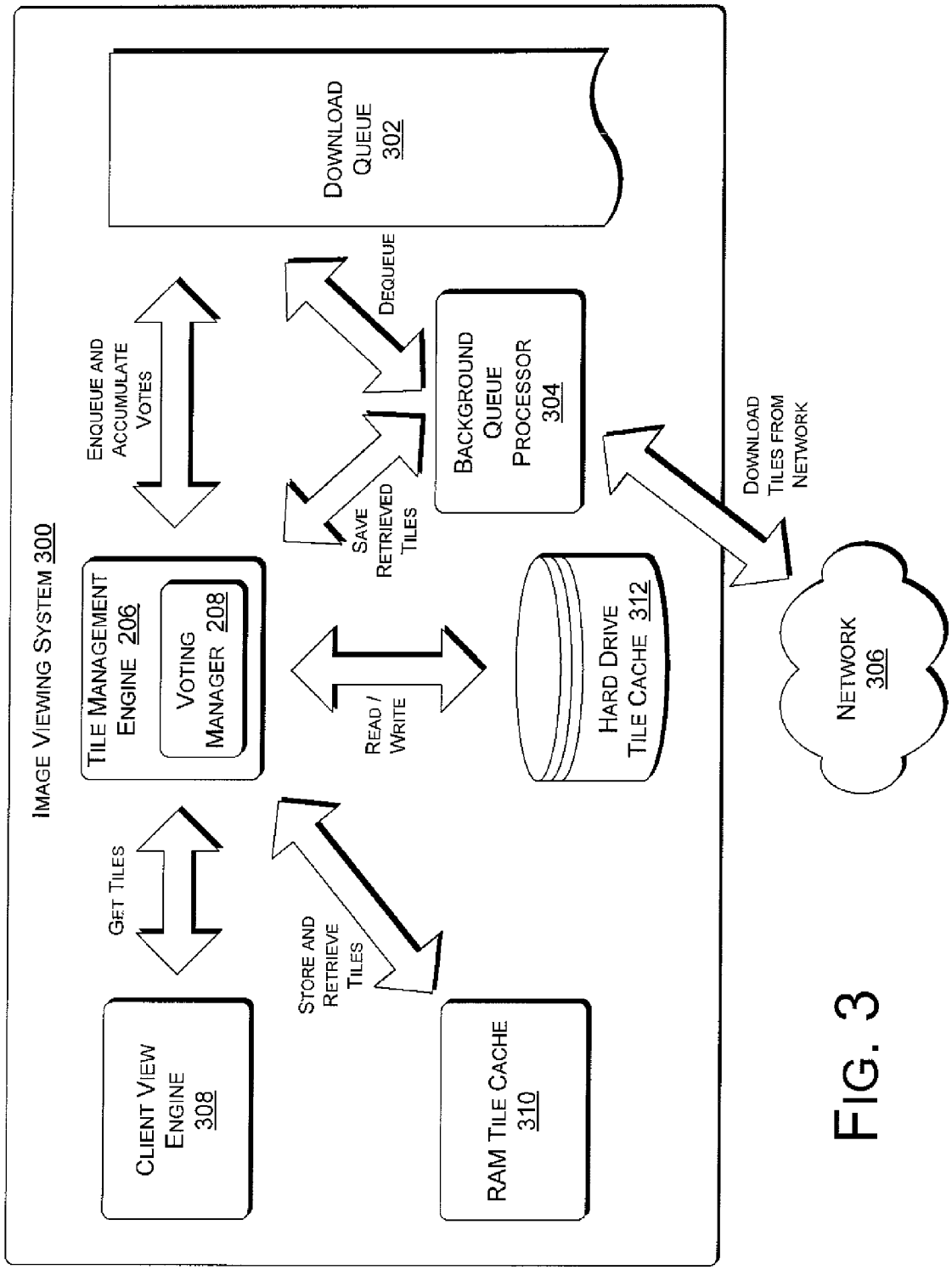
FIG. 3 is a diagram of an exemplary image viewing system including the exemplary tile management engine of FIG. 2.

FIG. 3 shows a system 300 in which the exemplary tile management engine 206 handles the procurement and provisioning of the image data that constitute the tiles in the tiled image hierarchy 100. Besides the tile management engine 206, the exemplary system 300 includes a download queue 302 for queuing the identities of tiles to be downloaded, a background queue processor 304 to download the tiles over a network 306, a client view engine 308 to generate the current client view, a memory tile cache 310 to store downloaded tiles in random access memory or other volatile storage medium, and a hard drive tile cache 312 to store downloaded images on a hard drive or other nonvolatile storage medium.

In one implementation, the client view engine 308 responds to input from a user's mouse or other control device, to determine the view within a large image, including which location coordinates in the image and which level of resolution to use for creating the view. In one implementation, when the system 300 starts, the images that are needed to show an opening view are retrieved by the tile management engine 206, and if they are not immediately available locally then they are queued up for download. The current view parameters can be stored as a target point in the coordinate system of the dataset, and a zoom value—e.g., a double precision floating point value independent of the view port size. In various scenarios, these parameters represent latitude and longitude for geographical data; right ascension and declination for astronomical data; and arbitrary x and y coordinates for panoramic images, etc.

When the user changes the view by panning or zooming, a new target view parameter set is created. The exemplary system 300 can then use a timer to chase the target over a period of time. Each update of the current display coordinates may include a portion of the difference to the target value. When the difference is negligible the current coordinates are set to exactly match the targets.

In one implementation, the exemplary system 300 optimizes the target points to lie on zoom levels that allow for the least amount of scaling of the image data at that target zoom, usually a 1:1 match, so that no re-filtering or scaling of the image is required when the viewer settles to that viewpoint.

Depending on implementation, the client view engine 308 either informs the tile management engine 206 of the location and zoom parameters of the desired view and allows the tile management engine 206 to decide which tiles can be immediately provided to fulfill the view, or in another implementation, the client view engine 308 requests tiles directly for the current view. The tile management engine 206 then aims to obtain the best tiles for immediately painting the client's view. That is, if the optimal or exact tiles are not available because they have not been downloaded yet, then the tile management engine 206 queries to see if a slightly lower resolution view can be obtained from an already-downloaded parent or grandparent tile of the unavailable tile(s). At the same time, the tile management engine 206 decides which tile(s) should be downloaded next by the background queue processor 304—that is, the tile management engine 206 decides the dynamically changing order of tile identities in the download queue 302.

For painting a view while the image is moving during panning, a parent or grandparent tile that covers more view area may be more useful than its many higher-resolution children tiles. Accordingly, the voting manager 208 assigns such a parent or grandparent tile more votes, for a higher priority in the download queue 302. Once a tile is downloaded, the background queue processor 304 de-queues it's identity from the download queue 302 and the tile management engine 206 saves the tile to the memory tile cache 310 and to the hard drive tile cache 312.

If a requested tile is available locally in the memory tile cache 310 or the hard drive tile cache 312, then the tile is not downloaded from the network 306, of course, but retrieved immediately from the local devices.

The tile management engine 206 queues, obtains in real time, and optionally modifies, if necessary, the image tiles that are needed for a current view of the large-scale image. The tile management engine 206 allows the system 300 to seamlessly paint a view of the image without pausing for tiles to be downloaded and without resorting to the compromised techniques of posting blank areas on the display or showing the process of painting while the user waits.

The superior visual effect achieved by the exemplary tile management engine 206 consists of a seamless and realistic display of the image at appropriate resolution that changes responsively in relation to panning and zooming as fast as the user can operate a mouse, scrolling wheel, or other input device. In other words, there is always a view on the display that appears realistic and correct and that responds to both panning and zooming with no sensation of waiting—no latency of display response. The view changes in a real time response to user input, only the resolution may temporarily suffer, but this is usually not noticeable across moving views that are in transition.

Exemplary Engine

Figure 4:
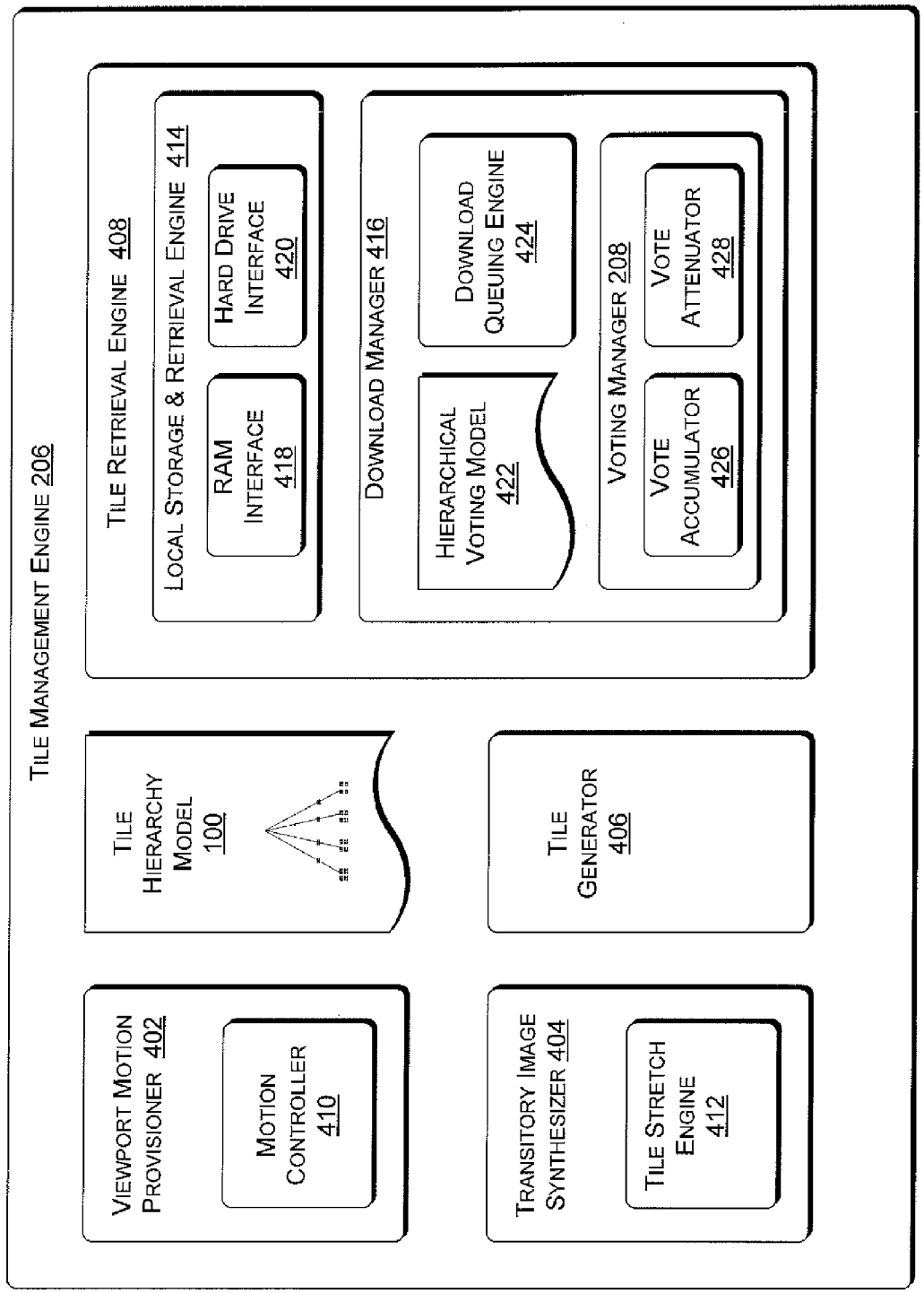
FIG. 4 is a block diagram of the exemplary tile management engine of FIGS. 2 and 3 in greater detail.

FIG. 4 shows the exemplary tile management engine 206 of FIGS. 2 and 3 in greater detail. The illustrated implementation is one example configuration, for descriptive purposes. Many other arrangements of the components of an exemplary tile management engine 206 are possible within the scope of the subject matter. For example, some of the components of the illustrated tile management engine 206 can be distributed differently within an exemplary system 300 like the example system shown in FIG. 3. Some components can be optional, depending on the implementation. The illustrated tile management engine 206 can be executed in hardware, software, or combinations of hardware, software, firmware, etc.

The exemplary tile management engine 206 includes a viewport motion provisioner 402, a transitory image synthesizer 404, the tile hierarchy model 100 introduced above, a tile generator 406 (optional in some versions), and a tile retrieval engine 408. The viewport motion provisioner 402 may further include a motion controller 410. The transitory image synthesizer 404 may further include a tile stretch engine 412. The tile retrieval engine 408 may include a local storage & retrieval engine 414, including a RAM interface 418 and a hard drive interface 420; and a download manager 416. The download manager 416 may further include a hierarchical voting model 422, a queuing engine 424, and the voting manager 208. The voting manager 208 may further include a vote accumulator 426 and a vote attenuator 428. In some implementations, components such as the viewport motion provisioner 402 and motion controller 410 are included or integrated in different parts of the exemplary system 300, such as in the client view engine 308. The operation of the exemplary tile management engine 206 and the interrelation of its components will now be described.

Operation of the Exemplary Engine

The exemplary tile management engine 206 stores the particular tile hierarchy model 100 being used. There are various ways to set up a tiled image hierarchy 100, for example, the number of resolution levels to be used is variable, and the number of child tiles per parent tile can also be varied, although the model represented by the decomposition diagram in FIG. 1 is common.

In operation, after the tile management engine 206 downloads the top-level tiles, then an image can always be viewable anywhere the user pans or zooms in the image. When a specific tile that is low down in the tile hierarchy model 100 is not available for immediate use, then the transitory image synthesizer 404 can resort to the top-level tiles to create a temporary view while the optimal tiles are being downloaded. For example, the tile stretch engine 412 can expand part of a parent tile during blurry panning movements to look almost like the optimal, child tiles being downloaded for that view.

Figure 5:
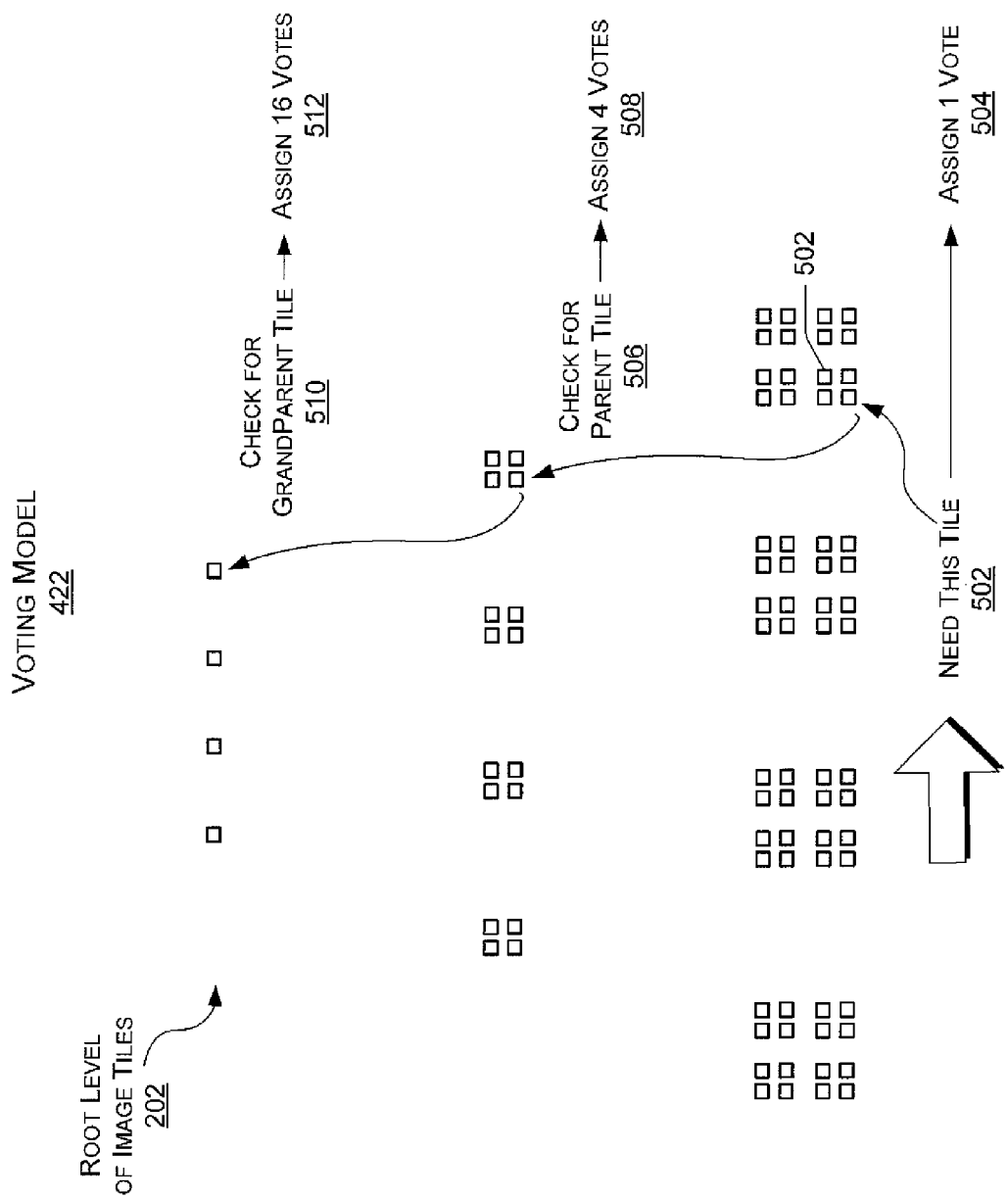
FIG. 5 is a diagram of an exemplary voting model.

As shown in the voting model 422 as illustrated in FIG. 5, when the local storage & retrieval engine 414 finds that the optimal image tile 502 for a given image location and resolution level is not available locally in either the RAM tile cache 310 or the hard drive tile cache 312, then in one implementation the voting manager 208 and the download queuing engine 424 of the download manager 416 queue up the identity of the missing tile with one vote 504. The tile management engine 206 checks the next layer up 506 (the parent tile) to see if that tile is available locally.

If the parent tile is not available, then in one implementation, the unavailable parent tile receives a multiple of the votes of its child, for example, four votes 508. Likewise, the tile retrieval engine 408 may check for a grandparent tile 510, and if unavailable, the vote accumulator 426 may assign an identifier of the unavailable grandparent tile sixteen votes 512. This continues until either a top level tile is reached or a tile in the parental lineage containing image data is reached (the grandparent tile happens to be the top-level tile in FIG. 5). Once a tile with actual image content is reached, the image data for the requested tile is either used directly if the reached tile is the optimal tile, or if not the optimal tile, the transitory image synthesizer 404 derives the image from the available image data by scaling it to the size requested.

In further detail, the download queuing engine 424 queues up tiles for download that are not immediately available locally. Each time a tile is referenced for display and is not available locally, the tile receives a vote to be added to its priority. When the tile is not available, its parent tile from the level above is queried. The image area covered by the unavailable tile is mapped to the parent region. In one implementation, if the parent does not contain a valid image then it is added to the download queue as well, but it receives a multiple of the votes (or a fraction of the votes, in another implementation) received by the child. If this parent tile is not available, then the process continues until a root level tile is found. As already mentioned, root level tiles can be synchronously loaded to ensure that the display always has image data, even if the tile stretch engine 412 has to apply a significant stretch.

The hierarchical voting model 422 causes tiles that cover the most area to be preferred in the download queue 302 over tiles of higher detail at a lower hierarchy level. Parent tiles that have several children requesting to be painted are preferred over ones with fewer. This provides for the best use of limited bandwidth. When the higher-order parent tile is downloaded, then all of its unavailable child tiles that have not yet been downloaded can still instantly have slightly better image data derived from the downloaded parent—the parent being used as a lower resolution proxy.

Because the display is constantly updated with the data available, and good coverage is usually maintained with the tile voting system, the user is free to navigate the view, moving around and zooming in and out at will. But this also means that the identities of the most important tiles to be immediately downloaded will change dramatically as the user navigates the display. Thus, the vote attenuator 428 reduces the number of votes associated with the tile identifiers in the download queue 302 at regular time intervals, i.e., each tile in the download queue 302 has to continue to receive votes in order to stay in the download queue 302. This prevents tiles that are no longer relevant to the current display view from taking download time and ensures effective use of limited bandwidth.

Referring back to FIG. 3, the background queue processor 304 downloads the tile with the most votes. Because of the above-described multiplication of votes that is applied on account of the parent-child tile relationships, the tile most likely to be downloaded first will cover the most area of the view to be painted.

In one implementation, when the user moves quickly to a new part of the large-scale image and the tiles to paint the image at the current resolution level are not available yet, the viewport motion provisioner 402 provides a parent or other tile higher up in the tile hierarchy 100 to the client view engine 308 to paint the view at a somewhat lower resolution level. In a very short time, more and more detail is available as downloading continues to occur and the display refreshes, i.e., at regular intervals and/or as more image data is available. The client view engine 308 supports the tile management engine 206 by using multi-generation tile synthesis, that is, uses tiles with synthesized data from their parents to allow for a simple, consistent interface from the point of view of painting while allowing each tile to have independent resolution. In one implementation, the display can be painted with tiles having almost any mix of resolution detail without special and/or additional processing by the client view engine 308.

Since the tiles that allow the broadest area and most complete coverage of the view are selected first for download according to the exemplary voting schema, when the user initiates movement, the view that the user typically sees already consists of image data at a usable quality level. As the user pans and zooms, the motion of the moving view does not allow the user to perceive all the fine detail in the transitory image. There is a built-in expectation of blur as images are panned and zoomed. This means that an image with lower quality but wide coverage can be used to help the user follow the motion of the viewport and to give the sensation that the image is always complete at the current resolution level.

To make the best use of this effect, the motion can be controlled so that it moves in a smooth manner when panning and zooming. Instead of snapping to a new location or zoom level, the viewport motion provisioner 402 can adjust incrementally toward the new view target. While this is happening, the tile retrieval engine 408 is allowed time to fetch the most relevant tiles and by the time the view settles to the new target there is a good probability that the optimal resolution tiles are available for display. During this time, the user is typically not aware that lower quality images are being displayed, as artifacts caused by the lower quality are masked by the movement.

In one implementation, as the user's view of the image is still in motion and has not yet come to rest at the location and zoom of interest, the motion controller 410 decelerates the movement of the view as it comes to rest, to match the timing of the downloading of the optimal image tiles for the view. During image movement, time used for settling in on the new coordinates, along with smoothing variable movement speeds into continuous motion, and an ease-in approach to the final target view location and scale—provide time for downloading the optimal image data for the target level of resolution.

In one variation, the moving image view rolls to a stop, i.e., a constant linear deceleration of the movement is applied during the last second or two (or less) as the optimal tiles are downloaded and painted. Other non-linear deceleration schemata may also be applied. The result provides a navigation of the large-scale image with a very natural feel and that is pleasing to the eye. That is, if optimal tiles are not available during user movement, then the parent or higher tiles are used to paint the image during the time that the human eye expects the view to be blurry from the motion, and then the optimal tiles are downloaded and ready to paint a complete image at the optimal resolution level as the movement comes naturally to a stop.

Referring back to FIG. 4, in one implementation the vote attenuator 428 periodically reduces (for example, periodically decimates) the number of votes of each of the tile identifiers stored in the download queue 302. In another implementation, the votes are reduced linearly with respect to time. In this manner, only the tiles that continue to be in demand stay in the download queue 302. Since the user may be moving around the image in many different ways, and very quickly, it is more important for the tiles that are currently needed to be retrieved rather than tiles that might previously have been needed.

Figure 6:
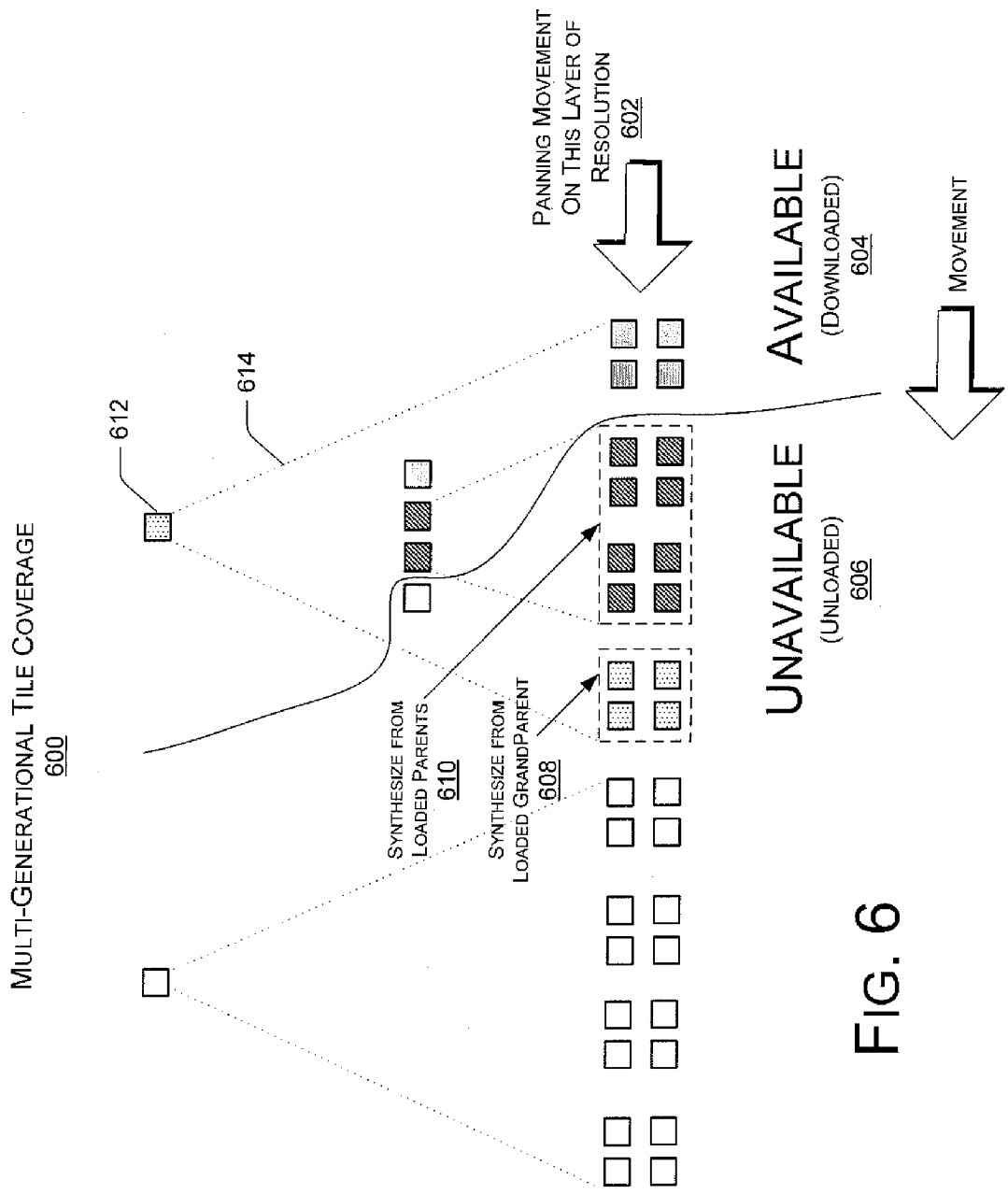
FIG. 6 is a diagram of exemplary multi-generational tile coverage.

As shown in FIG. 6, the multi-generation tile coverage 600 enabled by the hierarchical voting model 422 makes it difficult or infeasible for the user to "outdrive" the view. In virtually all cases, no matter how fast the user pans and zooms, there is likely to be sufficiently detailed image data available to display the view without the user noticing image degradation.

In the illustrated example that shows panning across the image on one resolution level 602, some tiles are available 604 but many tiles are not available 606 that would be needed to literally paint the view as it moves across the image at the current resolution level. Thus during movement, or even after movement if downloading is very slow, the transitory image synthesizer 404 can build the view from parent tiles 608 if the parent tiles are already downloaded. If parent tiles are not downloaded either, then the transitory image synthesizer 404 can build the view from grandparent tiles 610, or higher tiles. In other words, when a needed tile is allotted a vote to be downloaded, its parent tile (or higher tile) receives even more votes, or, the parent or higher tile is already downloaded because it has more tiles "underneath" in the hierarchy, each of these propagating votes for the parent tile to accumulate. Additionally, the number of votes is amplified by the multi-generational voting model 422 in which the tile retrieval engine 408 allots a higher multiple of votes to the higher tiles in the hierarchy. The result is that higher tiles 612 are fewer, and have a larger catchment area or "umbrella" 614 for accumulating votes. Once a higher tile 612 is downloaded, which is highly likely because of its ability to accumulate votes, it can be used to temporarily paint a great number of tiles under its umbrella 614 while they download, should the user decide to pan or zoom to those unloaded tiles.

In one implementation, the exemplary image viewing system 300 includes a background queue processor 304 that supports the tile management engine 206 in the manner that it uses the available bandwidth for downloading. In most conventional viewers, multiple tiles are simultaneously downloaded to increase efficiency. Parallelizing the download of several images at a time, however, can also parallelize the latency, minimizing the bandwidth lost to latency where no data transmission occurs. Thus, if downloading four tiles at once, the time it takes to receive any one of them is almost four times longer. By the time any of them are received, none of the tiles may even contribute to the current user view, if it is changing quickly. In the exemplary tile management engine 206, however, there is a temporal relevance to the tiles being downloaded. Maximizing the efficiency of bandwidth is less important than delivering the most important tile as fast as possible. Thus, in one implementation, the exemplary tile management engine 206 and/or the background queue processor 304 download only one tile at a time on lower bandwidth connections to maximize the likelihood that that tile can be used. The vote attenuator 428 culls out the tiles in the download queue 302 that are no longer relevant to the next view. Thus, the exemplary tile management engine 206 brings in the most relevant tiles immediately. This provides much more interactivity as the user moves around the image, than is conventionally available.

In one variation, the exemplary system 300 does not use pre-stored or pre-established image data for some or all of the tiles in a tile hierarchy 100. Rather, such a system includes a tile generator 406 to calculate or create the tiles as they are needed, wherein tiles with the most votes get calculated or created first. The image data can consist of data created locally on the fly, and can even consist of synthesized visualization data, generated mapping data, etc.

Exemplary Methods

Figure 7:
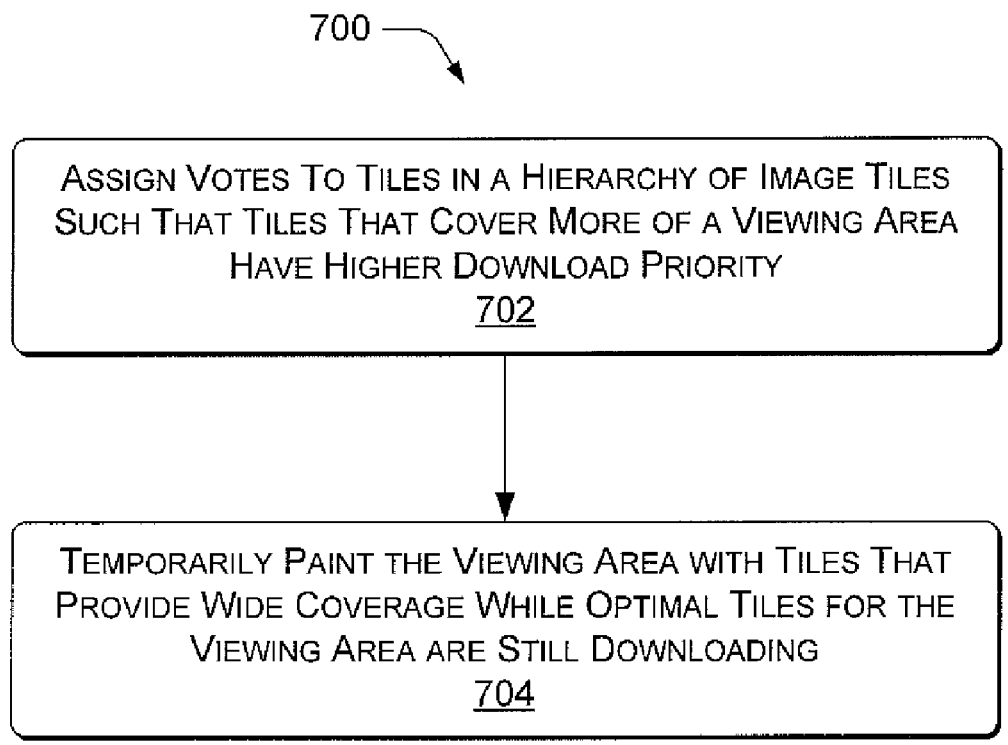
FIG. 7 is a flow diagram of an exemplary method of remotely viewing large image tile datasets.

FIG. 7 shows an exemplary method 700 of remotely viewing large tiled image datasets. In the flow diagram, the operations are summarized in individual blocks. The exemplary method 700 may be performed by hardware, software, or combinations of hardware, software, firmware, etc., for example, by components of the exemplary tile management engine 206.

At block 702, votes are assigned to tiles in a hierarchy of image tiles, so that those tiles that cover more of the viewing area, such as a browser viewport, are downloaded first. This provides immediate temporary coverage of the viewing area, as the image data of fewer lower resolution tiles can be stretched or expanded to proxy for the numerous higher resolution tiles that are still being downloaded. During image movement during panning and zooming, the resolution is less critical than during standstill, because the human eye is expecting a degree of blur instead of sharp detail.

In one implementation, the method includes accumulating votes on queued tiles so that a single vote for each of multiple child tiles triggers an avalanche of votes for parent tiles, that increases as the number of generations between child tile and higher-order (e.g., great-grandparent) tile increases. In one implementation, a child tile gets one vote, parent tiles get four votes, grandparent tiles get sixteen votes, etc. Thus, if ten tiles each get one vote to be downloaded, their common grandparent tile would get 1600 votes, and be allotted a much higher download priority. In turn, the grandparent tile can cover much of the viewport while the higher resolution child tiles are being downloaded.

At block 704, the viewing area is temporarily painted with the tiles that provide wide coverage, while the optimal tiles (i.e., the numerous child tiles for painting the view at the browser's current resolution level) are being downloaded. Because the wide coverage tiles can fill in as needed to paint the viewport, even if the view moves rapidly, it is difficult for the user to outdrive the ability of the exemplary method to keep the view current. The result is very responsive and realistic-looking navigation of the large-scale image.

Conclusion

The foregoing discussion describes remotely viewing large tiled image datasets. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented by a processor, the method comprising:
   arranging a multi-resolution image dataset into a hierarchy of image tiles;
   downloading the image tiles for browsing according to a number of votes assigned to each image tile, wherein a larger number of votes are assigned for the image tiles that cover a larger viewing area;
   assigning a priority to the votes assigned to each image tile, in relation to a size of a browser view of the hierarchy of the image tiles, wherein after assigning the votes for a child of the hierarchy, increasing the votes exponentially for a parent of the hierarchy, and further increasing the votes exponentially for a grandparent of the hierarchy;
   assigning a multiple of votes with a higher priority for the image tiles that create a full width view of the image tiles; and
   prioritizing the image tiles in a queue of tiles to be downloaded based on downloading the image tiles first that create the full width view of the image tiles wherein a user starts at the full width view of the image tiles before zooming in on details within the image tiles that create the full width view.

2. The method as recited in claim 1, wherein the downloading includes queuing an identifier of each image tile to be downloaded according to a number of votes assigned to each image tile.

3. The method as recited in claim 2, further comprising:
   attempting to retrieve an image tile locally before queuing the identifier; and
   queuing the identifier only when the image tile is not available locally.

4. The method as recited in claim 1, wherein the browsing includes panning and zooming at different resolution levels of the multi-resolution image dataset, wherein the panning and zooming initiate different browser views, each browser view comprising some of the image tiles at one of the resolution levels of the hierarchy of image tiles.

5. The method as recited in claim 4, further comprising:
   creating each browser view from the image tiles;
   wherein, when an image tile for the browser view is unavailable locally, then while the unavailable image tile is downloading the creating includes synthesizing at least part of the browser view using part of a locally available image tile from along a parental lineage of the unavailable image tile within the hierarchy of image tiles.

6. The method as recited in claim 1, further comprising:
   attempting to retrieve an image tile locally;
   when the image tile is not available locally, assigning one vote to an identifier of the image tile; and
   queuing the identifier according to the one vote with identifiers of other image tiles to be downloaded.

7. The method as recited in claim 6, further comprising:
   attempting to locally retrieve a parent tile of the image tile in the hierarchy of image tiles;
   when the parent tile is not available locally, assigning a multiple of the one vote to an identifier of the parent tile; and
   queuing the identifier of the parent tile according to the multiple votes.

8. The method as recited in claim 7, further comprising:
   progressing generation-by-generation in the hierarchy of image tiles along a progressively higher parental lineage starting from the image tile, until a locally available image tile is found along the parental lineage;
   for each generation traversed, when the image tile of the current generation is not available locally, assigning a higher multiple of votes to the identifier of the unavailable image tile than was assigned at the previous generation; and
   queuing the identifier of the unavailable image tile of the current generation according to the higher multiple of votes.

9. The method as recited in claim 8, further comprising accumulating additional votes to an already-queued identifier, wherein the additional votes are assigned for each image tile along a child lineage of the already-queued identifier that attempts to locally retrieve the already-queued identifier's image tile.

10. The method as recited in claim 9, wherein accumulating the additional votes comprises assigning a multiple of votes that increases exponentially for each generation of the hierarchy between the identifier accumulating the votes and the child image tile along the child lineage.

11. The method as recited in claim 9, further comprising attenuating the votes of each queued identifier to give a downloading priority to image tiles that are relevant to a current view of the browsing.

12. The method as recited in claim 11, wherein the attenuating comprises either reducing votes in a linear relation to time or decimating the votes at regular intervals.

13. The method as recited in claim 1, further comprising controlling a movement of a browsing view during panning and zooming motions while image tiles for a browser view are downloading.

14. The method as recited in claim 13, wherein the controlling includes one or both of smoothing a varying speed of movement of the browser view, and applying a deceleration of the movement near a target browser view, while the tiles for the browser view are downloading.

15. The method as recited in claim 1, wherein the step of downloading image tiles is replaced by a step of creating the image tiles via a mathematical calculation;

wherein tiles with the most votes are calculated or created first; and wherein image data of the image tiles consists of data created locally, including synthesized visualization data or generated mapping data.

16. A system, comprising:

a memory;

a processor coupled to the memory;

a tile management engine to provide image tiles of a multi-resolution image dataset to an image browser, the image browser to provide browser views;

a voting accumulator to assign votes to the image tiles for determining an order of downloading or creating the image tiles while the image browser is providing multiple browser views, wherein a larger number of votes are assigned for the image tiles that cover a larger viewing area;

the voting accumulator to assign a priority to the votes assigned to each image tile, in relation to a size of a browser view of the hierarchy of the image tiles, wherein after assigning the votes for a child of the hierarchy, increasing the votes exponentially for a parent of the hierarchy, and further increasing the votes exponentially for a grandparent of the hierarchy;

the tile management engine to assign a priority of the assignment of the multiple votes in relation to the browser views; and the tile management engine to obtain the image tiles to seamlessly paint the browser view for a client, wherein the browser view includes browser view parameters to change the browser view by panning or zooming.

17. The system as recited in claim 16, further comprising:

a download queue;

a tile retrieval engine including a hierarchical voting model, wherein when an image tile for a browser view is unavailable on a local computing device, then the tile retrieval engine assigns a vote to an identifier of the unavailable image tile and queues the identifier in the download queue;

wherein the tile retrieval engine checks along a progressively higher parental lineage of the unavailable image tile until a locally available image tile is found along the parental lineage;

wherein for each generation traversed along the parental lineage, when the image tile of a given generation in the parental lineage is not available locally, the tile retrieval engine assigns to an identifier of the unavailable image tile a multiple of the votes assigned to an identifier of an unavailable image tile of the previous lower generation; and wherein the tile retrieval engine queues the identifiers of the unavailable image tiles of each generation into the download queue according to the votes assigned to each identifier.

18. The system as recited in claim 17, further comprising:

a transitory image synthesizer to create a transitory browser view from an image tile along a parental lineage of an unavailable image tile that is downloading; and a viewport motion provisioner to control a motion of the transitory browser view during panning or zooming to maintain the transitory browser view while the unavailable image tile is downloading.

19. The system as recited in claim 17, wherein the hierarchical voting model allows image tiles that provide the most complete coverage of the browser view to be downloaded first.

20. A method for viewing tile images implemented on a processor, the method comprising:

providing the image tiles of a multi-resolution image dataset for creating browser views on a computer display, the browser views are images created on a browser;

determining a priority of assigning votes to the image tiles that create the browser views, wherein a larger number of votes are assigned for the image tiles that cover a larger viewing area;

assigning votes to the image tiles for determining an order of downloading or creating the image tiles to provide different browser views, such that a corresponding part of the multi-resolution image is always current in each browser view, wherein after assigning the votes for a child of the hierarchy, increasing the votes exponentially for a parent of the hierarchy, and further increasing the votes exponentially for a grandparent of the hierarchy;

determining identities of the image tiles to be downloaded; and assigning a multiple of votes with a higher priority for the image tiles that cover more viewing area of the computer display to be painted while an image is panning.

* * * * *